(12) United States Patent
Clute

(10) Patent No.: US 7,806,439 B2
(45) Date of Patent: Oct. 5, 2010

(54) ACTIVE ANTI-BUNCHING D-RING SEAT BELT SYSTEM

(75) Inventor: Günter K. Clute, Bloomfield Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 751 days.

(21) Appl. No.: 11/749,471

(22) Filed: May 16, 2007

(65) Prior Publication Data
US 2008/0288141 A1 Nov. 20, 2008

(51) Int. Cl.
B60R 22/00 (2006.01)
(52) U.S. Cl. .................... 280/801.1; 280/805; 280/806; 701/45; 297/482; 297/483
(58) Field of Classification Search .............. 280/801.1, 280/805, 808; 297/482, 483
See application file for complete search history.

(56) References Cited

U.S. PATENT DOCUMENTS

| 4,982,982 | A | * | 1/1991 | Nishimura | ................. | 280/808 |
|---|---|---|---|---|---|---|
| 5,037,135 | A | * | 8/1991 | Kotikovsky et al. | ......... | 280/808 |
| 5,096,224 | A | * | 3/1992 | Murakami et al. | .......... | 280/808 |
| 5,732,974 | A | * | 3/1998 | Sayles | ........................ | 280/805 |
| 6,032,982 | A |   | 3/2000 | Pakulsky et al. | | |
| 6,033,030 | A |   | 3/2000 | Valasin | | |
| 6,273,469 | B1 | * | 8/2001 | Kwaske et al. | .............. | 280/805 |
| 6,478,334 | B1 | * | 11/2002 | Desmarais et al. | .......... | 280/805 |
| 7,080,856 | B2 | * | 7/2006 | Desmarais et al. | .......... | 280/808 |
| 7,367,590 | B2 | * | 5/2008 | Koning et al. | ............ | 280/801.2 |
| 7,380,833 | B2 | * | 6/2008 | Bronner et al. | ............. | 280/808 |
| 7,416,217 | B2 | * | 8/2008 | Cord et al. | ............... | 280/801.1 |

* cited by examiner

Primary Examiner—Toan C To
(74) Attorney, Agent, or Firm—Sally J Brown; Brinks Hofer Gilson & Lione

(57) ABSTRACT

A motor vehicle seat belt system having an active system for avoiding bunching of webbing in a D-ring during a rapid deceleration event. The system includes a controlled locking mechanism engageable with a rotatably mounted D-ring to restrict backward rotation of the D-ring.

18 Claims, 4 Drawing Sheets

ACTIVE ANTI-BUNCHING D-RING SEAT BELT SYSTEM

BACKGROUND

This invention relates to automotive safety restraint systems and, in particular, to an active three-point seat belt system with a D-ring rotation restraint.

Numerous designs of passive and active automotive occupant restraint systems are known for enhancing occupant protection in the event of a vehicle crash. Passive systems such as inflatable restraints or air bags and automatically deployed seat belt systems are known. Active seat belt systems have been used for many decades and are manually deployed by the occupant. The conventional seat belt system uses three points of connection with the vehicle structure and incorporates a lap belt section for restraining the occupant's lower torso and a shoulder belt section for restraining the occupant's upper torso. The seat belt restrains movement of the occupant in the event of a vehicle impact or rollover event. In order to enhance the comfort and convenience provided by the seat belt system, retractors are normally used which permit the belt webbing to be extracted and retracted onto the retractor, allowing movement of the occupant while maintaining the belt in close contact with the occupant. An inertia sensitive actuator locks the retractors when an impact or rollover event is detected, preventing extraction of webbing.

A seat belt system may use a three-point restraint system having a fixed upper shoulder belt anchorage. More commonly, however, the shoulder portion of the seat belt webbing extends from a retractor mechanism secured to the interior of the vehicle, most often near the lower portion of the "B-pillar" with the lower end of the bolt attached to a fixed exchange or a second belt retractor. In such installations, the webbing undergoes a sharp bend and slides through and a narrow slotted opening in a "turning loop" or D-ring for extending down and across the occupant's torso to a tongue latch. The seat belt system is engaged when the occupant inserts the latch into a buckle. The D-ring may be attached to a height adjustment mechanism installed in the B-pillar in order to comfortably accommodate the size and height of the occupant. To facilitate extraction and retraction of the webbing as well as to maximize occupant comfort, the D-ring rotates about an axis defined by a fastener mounted to the height adjustment mechanism and the B-pillar.

When the vehicle rapidly decelerates, such as during a collision, the seat belt webbing may stretch, its edges may curl, and it may slide laterally forward and bunch up in the corner of the slotted opening in the D-ring, a condition known as bunching. As the webbing collects in the corner of the D-ring, the deceleration forces acting through the webbing on the D-ring tend to cause the leading edge of the D-ring to rotate downwards and backwards. As the webbing collects, or bunches, the tension forces exerted on the webbing are concentrated in the leading corner of the D-ring rather than distributed evenly across the entire length of the D-ring slotted opening. The bunching can also cause uneven loads on the webbing itself and can interfere with further controlled extraction of webbing desirable for load limiting operation, or belt restriction for belt tensioning as the slotted opening restricts movement of the bunched portion of the webbing.

It would be desirable to have a system which permitted the D-ring to rotate freely in order to accommodate extraction and retraction of webbing when the occupant attaches and detaches the seat belt, but which restricts backward rotation of the D-ring during a rapid deceleration to minimize bunching of the webbing.

SUMMARY OF THE INVENTION

The present invention is an active system which prevents the D-ring from rotating backwards in a rapid deceleration event. In one embodiment, an active seat belt assembly includes a D-ring and a controlled locking mechanism engagable with the D-ring for restricting its backward rotation. In another embodiment, the locking mechanism comprises a locking pin operated by an electric solenoid which engages the locking pin when signaled by a controller or electrical signal. In another embodiment, the solenoid engages the locking pin when the tongue of the seat belt latch is inserted into the buckle. When the occupant unlatches the seat belt buckle in said embodiment, a spring disengages the locking pin thereby permitting the D-ring to rotate backwards and the webbing to retract smoothly into the retractor mechanism.

Additional benefits and advantages of the present invention will become apparent to those skilled in the art to which the present invention relates from the subsequent description of the embodiments and the appended claims, taken in conjunction with the accompanying drawings.

DETAILED DESCRIPTION OF THE INVENTION

The following description of preferred embodiments is merely exemplary in nature and is in no way intended to limit the invention or its application or uses.

Figure 1:
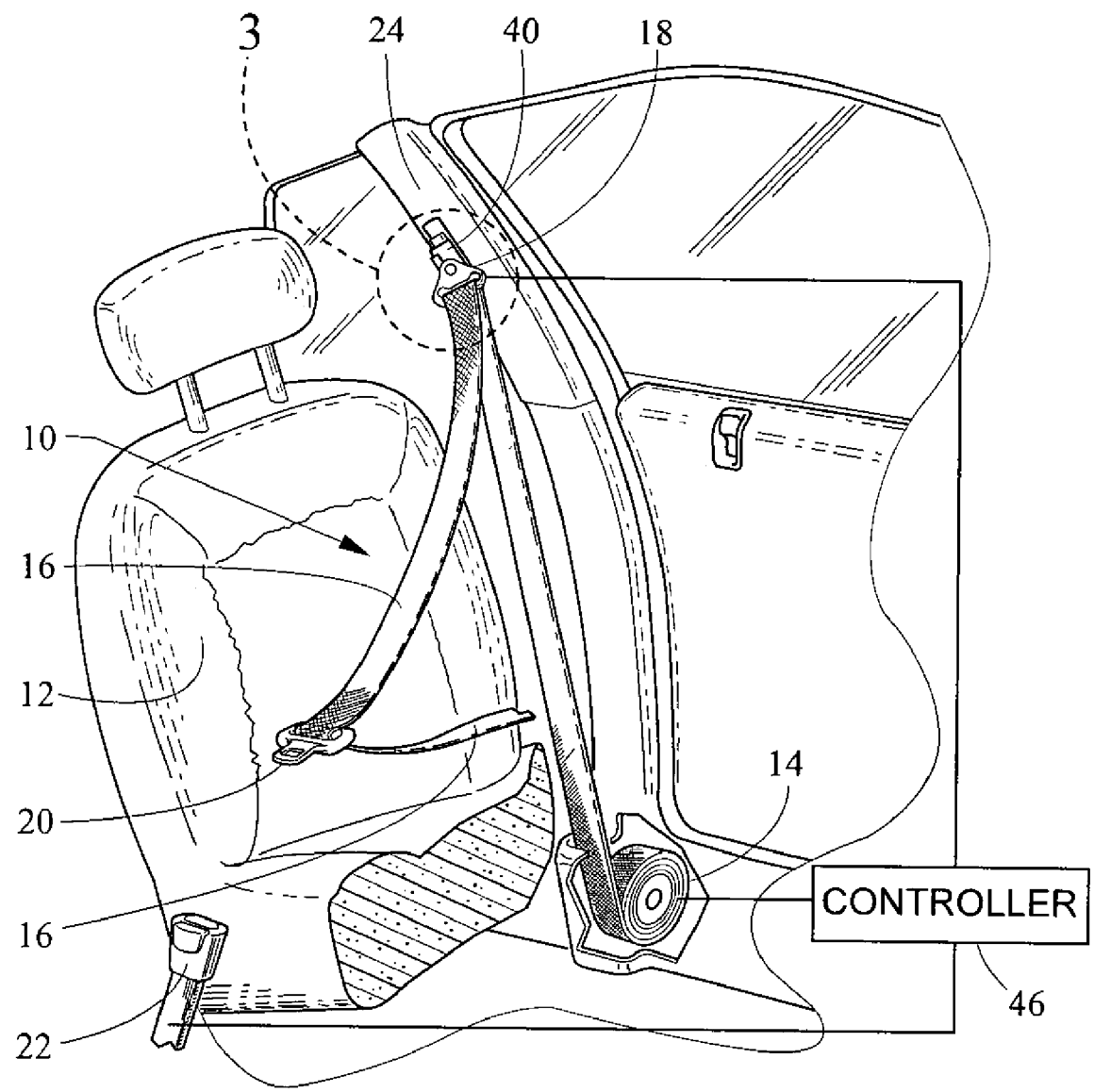
FIG. 1 is an overview of a three point seat belt system incorporating an anti-bunching D-ring in accordance with the present invention.

The present invention is an active three point automotive seat belt system to restrict the backward rotation of a D-ring to minimize bunching of webbing during a rapid deceleration event. FIG. 1 shows three point seat belt system 10 in a typical installation in an automotive vehicle to protect an occupant seated in seat 12. Seat belt system 10 principally comprises shoulder retractor 14 and webbing 16. In one typical installation, shoulder retractor 14 is installed at or near the base of B-pillar 24 of the vehicle. Webbing 16 extends from shoulder retractor 14 and passes through a turning loop, or D-ring 18 mounted to the vehicle body, typically on or near the B-pillar 24. D-ring 18 is commonly rotatably attached to a vertically adjustable mounting unit 40 attached to B-pillar 24 above shoulder retractor 14 and above and behind the outside shoulder of the seat occupant. Seat belt system 10 is deployed when the occupant grasps and inserts tongue 20 into buckle 22 securing them together by "latching" the seat belt. A torsion spring within shoulder retractor 14 takes up slack in the other end of webbing 18 as the occupant deploys the system. Shoulder retractor 14 anchors the upper portion of webbing 16.

In one preferred embodiment of the system 10, tongue 20 is permitted to freely slide along webbing 16. The lap belt section of webbing 16 extends from tongue 20, passes across the lap of an occupant and terminates at or near the floor of the vehicle at a lower anchorage position. FIG. 1 shows a single retractor system, where the lap belt section is anchored to the vehicle frame, or possibly to the seat frame structure. Depending on the application, it may be preferable to have two webbing retractors in addition to shoulder retractor 14, the end of the lap belt section of webbing 16 may be attached to a lap retractor (not shown) installed near the floor of the vehicle proximate to the lower torso region of the occupant. In a dual retractor installation, tongue 20 ordinarily does not slide freely along webbing 16, but rather is fixed to the ends of the lap belt and shoulder sections of webbing 16.

In some vehicle installations, shoulder retractor 14, buckle 22, and the terminal end of the lap belt section are all mounted to the vehicle frame, with D-ring 18 mounted to the B-pillar 24. Some vehicles available today feature so-called integrated structural seats, which have sufficient internal structural integrity to permit shoulder retractor 14, buckle 22, and the terminal end of the lap belt section of the webbing to be mounted to the movable part of the seat. Three point seat belt system 10 in accordance with this invention may be mounted in these and various other manners.

Should retractor 14 operates in the manner of so-called emergency locking retractors in which a torsion spring provides a retraction force on the webbing 16 at all times. An internal saw tooth profile ratchet wheel (not shown) within the retractor engages with locking elements to prevent extraction of the webbing 16 during a period of rapid deceleration, such as a collision. Such events may be detected through the use of internal pendulum or ball-type inertia sensitive actuators or electronic sensing devices. Shoulder retractor 14 (and a lap retractor if present) may include internal mechanisms in which retraction and extension may also be controlled electronically by a controller 46 based on multiple sensory inputs.

Figure 2A:
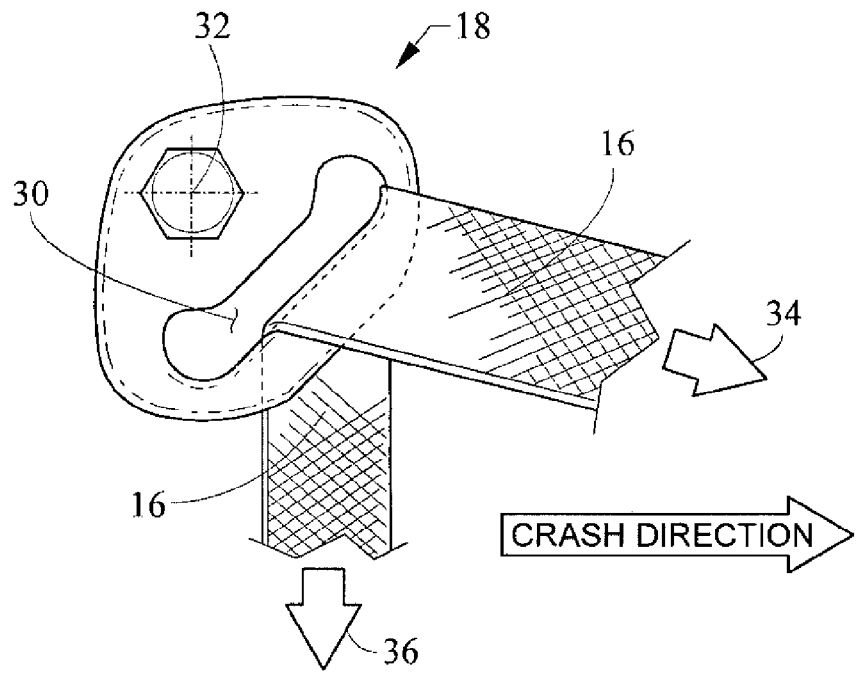
FIG. 2a is an isolated view of a D-ring in the prior art showing webbing beginning to bunch into the forward corner.
Figure 2B:
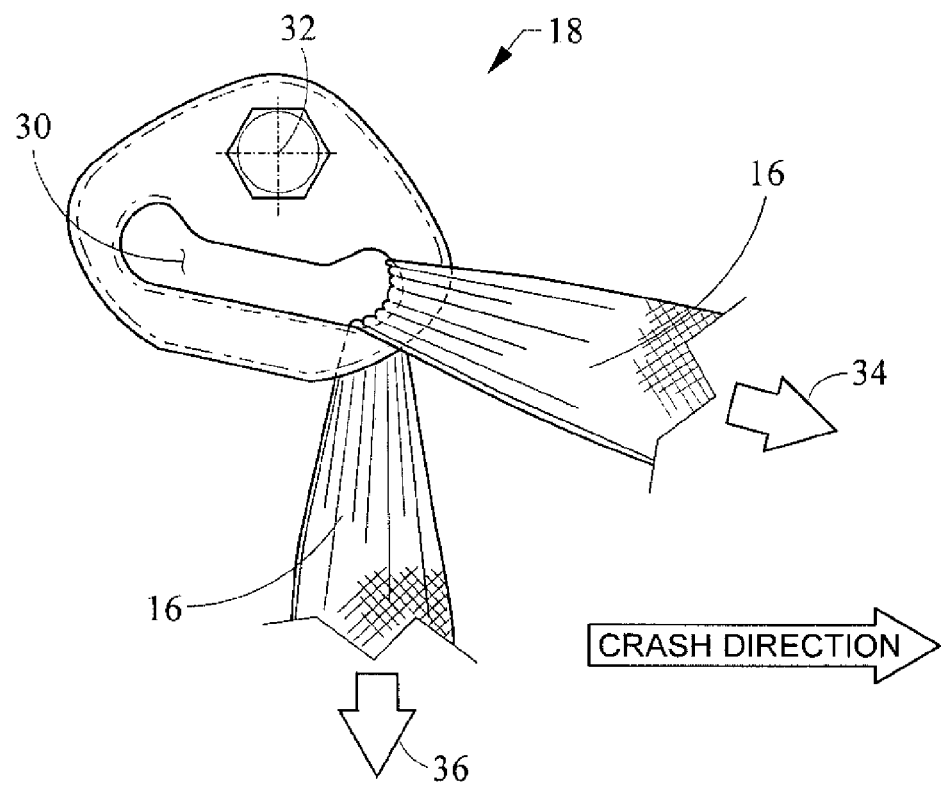
FIG. 2b is an isolated view of a D-ring in the prior art showing undesired rotation due to bunching and deceleration forces.

FIGS. 2a and 2b depict a D-ring system as commonly deployed in the prior art. D-ring 18 has an oblong slotted opening 30 through which seat belt webbing 16 passes. In a typical installation, D-ring 18 rotates about axis 32, defined by a threaded fastener or similar connector attaching D-ring 18 to B-pillar 24 along axis 32. Prior to an occupant's entering the vehicle, webbing 16 has only slight tension, D-ring 18 hangs down relatively freely, and slotted opening 30 is typically relatively horizontal. FIG. 2a shows the position of the D-ring 18 and webbing 16 with the seat belt system deployed as the vehicle begins to rapidly decelerate, such as in hard braking or during a collision. As the motor vehicle decelerates, the momentum of the occupant exerts substantial force 34 on the shoulder portion of webbing 16. At the same time, the shoulder retractor end of webbing 16 exerts on D-ring 18 approximately the same magnitude of force in a downward direction 36. In a typical installation where shoulder retractor 14 is installed below D-ring 18, the combination of forces acting on the webbing 16 and D-ring 18, particularly forces 34 and 36, combined with the stretching of the webbing 16 tend to cause webbing 16 to curl and translate forward and collect in the forward edge of slotted opening 30, a condition known as D-ring bunching.

FIG. 2b shows the effect of such bunching. The bunching of webbing 16 at the forward edge of slotted opening 30 causes the forward force 34 exerted by the occupant and downward force 36 exerted by the shoulder retractor to concentrate at the leading edge of the slotted opening 30. Bunching and the resultant concentrated loads on the leading corner of the D-ring has led to D-rings being designed to withstand the concentrated loading created by this condition. D-rings may be larger and bulkier than if webbing forces were more evenly distributed across the bottom of slotted opening 30. Moreover, shoulder retractor 14 may incorporate load limitation features that permit limited extraction of webbing 16 during a rapid deceleration event. Bunching interferes with the smooth flow of the webbing through the D-ring opening 30. Smooth flow of webbing 16 through slotted opening 30 is desirable during a rapid deceleration event to accommodate webbing stretching and/or partial webbing extraction as shoulder retractor 14 operates in a load-limiting mode and may also be desirable to accommodate webbing retraction through retractor tensioning operation.

Figure 3:
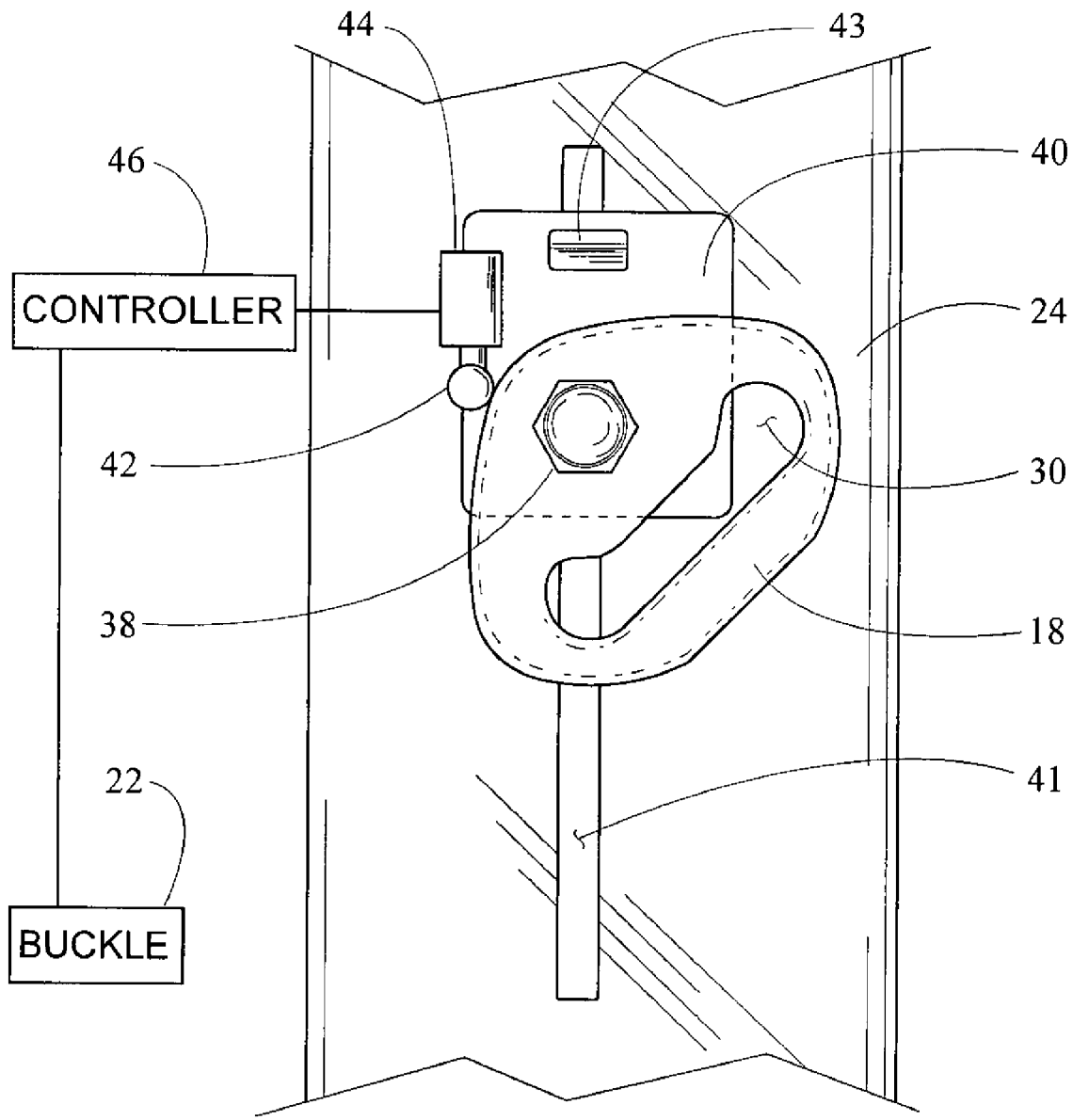
FIG. 3 is a side view of an anti-bunching D-ring showing a locking pin activated by a solenoid attached to a controller.
Figure 4:
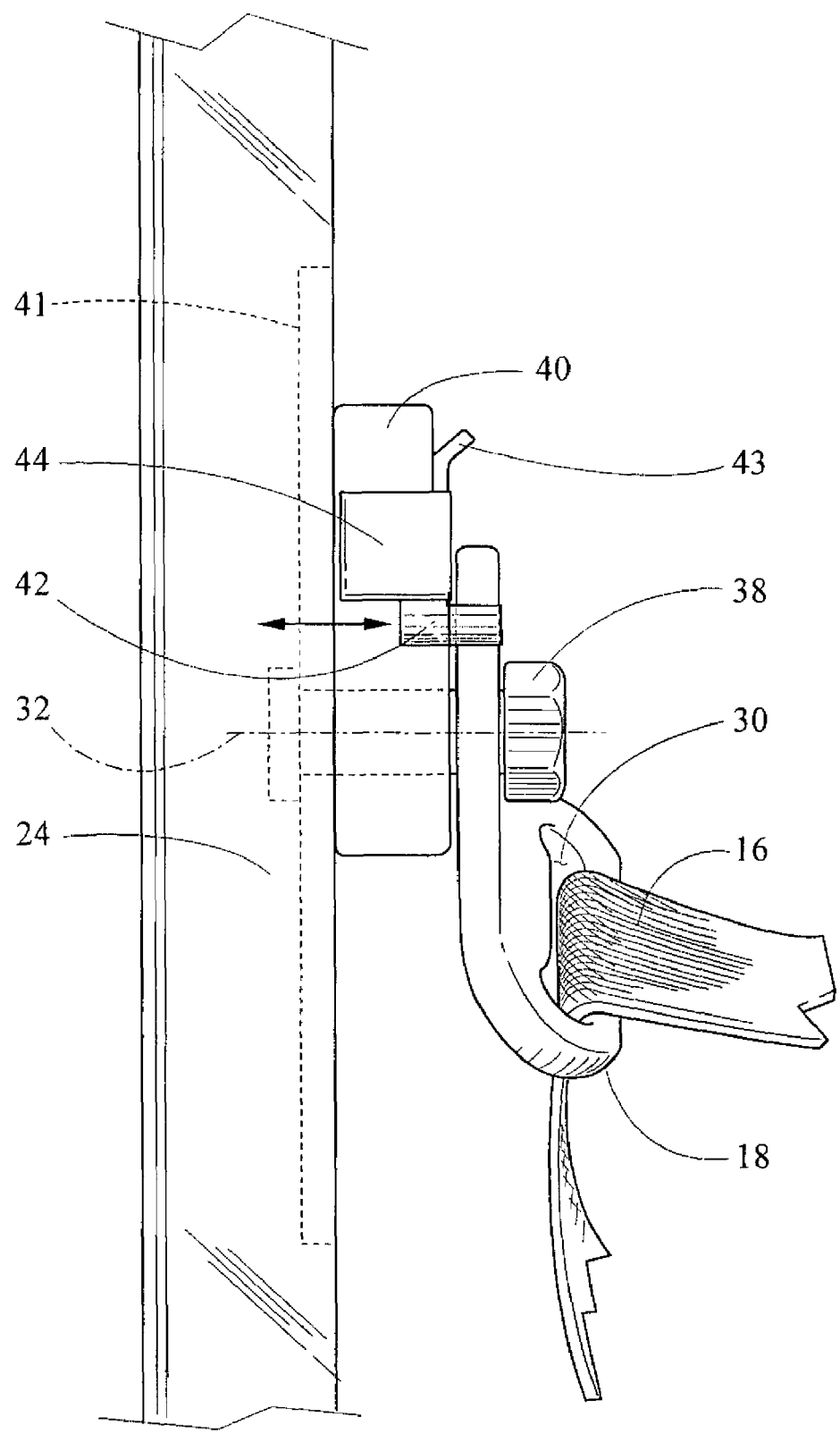
FIG. 4 is another view of an anti-bunching D-ring showing a locking pin and activating solenoid.

FIGS. 3 and 4 show a D-ring system in which a locking mechanism engages to restrict the backward rotation of D-ring 18. D-ring 18 is shown rotatably attached to an optional vertical adjustment unit 40 which is in turn attached to B-pillar 24 by means of a threaded fastener 38 passing through D-ring 18. Vertical adjustment unit 40 cooperates with an anchorage assembly and a vertical elongated track 41 typically having a C-shaped cross section. When a lever 43 on vertical adjustment unit 40 is depressed, vertical adjustment unit 40 and D-ring 18 become slidable up or down B-pillar 24 along the elongated track 41.

As shown in FIGS. 3 and 4, a controllable locking mechanism 42 is attached to vertical adjustment unit 40 to restrict the range of D-ring rotation when engaged. When engaged, locking mechanism 42 restricts D-ring 18 from rotating freely backwards (away from the collision). With its rotation restricted, the orientation of slotted opening 30 of D-ring 18 remains in a position to distribute load forces 34 and 36 more evenly across slotted opening 30 during rapid deceleration. By assuring more even distribution of loading forces, D-ring 18 may be designed in ways that are more efficient and less obtrusive while providing enhanced performance.

In one embodiment, the locking mechanism is comprised of a locking pin 42 activated by an electric solenoid 44. When provided with an appropriate signal, solenoid 44 will activate and pull locking pin 42 into a position to interfere with the rotational arc of D-ring 18 to restrict its range of backward pivoting rotation. Other controllable locking mechanisms include a friction brake or other electromechanical locking systems. In one embodiment, solenoid 44 will engage locking pin 42 when tongue 20 is inserted into buckle 22, with buckle 22 sending a signal to controller 46, which sends a signal to activate solenoid 44 to engage locking pin 42. Alternatively, the locking mechanism could be engaged by a signal generated in response to a timer, vehicle movement, a period of rapid deceleration such as a collision, or engaged mechanically such as by the force of an occupant's weight in seat 12. In another embodiment, the locking mechanism could be engaged by a direct electrical current upon latching buckle 22 with tongue 20 without intervening controller 46. In these or other embodiments, the solenoid apparatus may comprise a spring or other biasing mechanism within the solenoid apparatus to disengage the locking pin from the rotation path of D-ring 18 when the solenoid is not powered, allowing D-ring 18 to rotate freely. In this embodiment, when the motor vehicle is stopped and an occupant unlatches buckle 22, the solenoid will not be powered, the spring will disengage the locking pin, and D-ring 18 will be free to rotate to a more horizontal orientation allowing webbing 16 to smoothly retract and extract from shoulder retractor 14.

Seat belt system 10 may incorporate webbing retractors such as shoulder retractor 14 which have internal pretensioning devices which cause slack in seat belt system 10 to be taken up in the event of a sensed impact, or incorporate load-limiting devices that allow webbing 16 to extract from a retractor in a controlled manner during a rapid deceleration event. Seat belt system 10 may also incorporate sensors related to transmission gear position, ignition key positions, door closure position, occupant position, or vehicle motion and acceleration. Collectively, these and similar sensors relating to vehicle operating conditions are defined as "vehicle operating sensors" in this specification and the claims. Signals sent by such sensing systems may be sent to controller 46, along with the signal indicating when tongue 20 and buckle 22 are latched. Controller 46 could be programmed based on any combination of signals sent by these and other sensors to engage or to disengage D-ring locking mechanism 42.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims

I claim:

1. A motor vehicle seat belt system comprising:
   seat belt webbing having an upper anchorage and a lower anchorage;
   a retractor engaging an end of the webbing at the upper anchorage or the lower anchorage for allowing extraction and retraction of the webbing;
   a tongue engaging the seat belt webbing;
   a buckle engageable with the tongue to secure the seat belt webbing across an occupant, the buckle producing a latching signal which indicates a state of the buckle either being latched with the tongue or unlatched from the tongue;
   a D-ring rotatably mounted to a fixed member of the motor vehicle and positioned on the belt webbing between the upper anchorage and the tongue for positioning and guiding the webbing between the upper anchorage and the tongue; and
   a controlled locking mechanism controlled by a locking signal engageable with the D-ring for restricting the range of backward rotation of the D-ring when the latching signal indicates the tongue and the buckle is in the latched state.

2. The system of claim 1 wherein when the latching signal indicates that the tongue and the buckle are in the latched state, causes the locking mechanism to engage.

3. The system of claim 1 wherein when the latching signal indicates that the tongue and the buckle are in the unlatched state, causes the locking mechanism to disengage.

4. The system of claim 1 where the locking mechanism is a locking pin.

5. The system of claim 4 where the locking signal causes an electric solenoid system to engage the locking pin.

6. The system of claim 1 further comprising a vehicle operation sensor that causes the locking signal to be sent to the locking mechanism.

7. The system of claim 1 where the fixed member is a B-pillar of a motor vehicle.

8. The system of claim 7 further comprising the D-ring being rotatably mounted to the B-pillar by means of a vertically adjustable mechanism slidably attached to the B-pillar and further comprising the locking mechanism being attached to the vertically adjustable mechanism.

9. A motor vehicle seat belt system comprising:
   seat belt webbing having an upper anchorage and a lower anchorage;
   a retractor engaging an end of the webbing at the upper anchorage or the lower anchorage for allowing extraction and retraction of the webbing;
   a tongue engaging the seat belt webbing;
   a buckle engageable with the tongue to secure the seat belt webbing across an occupant;
   a D-ring rotatably mounted to a vertical adjustment unit which is in turn slidably mounted to a B-pillar of a motor vehicle, the D-ring being positioned on the belt webbing between the upper anchorage and the tongue, for positioning and guiding the webbing between the upper anchorage and the tongue;
   a locking pin engageable with the D-ring for restricting the range of backward rotation of the D-ring;
   an electric solenoid operatively connected to the locking pin; and
   a latching signal produced by the condition of the tongue and buckle being latched, which signal causes the solenoid to engage the locking pin.

10. The system of claim 9 further comprising a controller in communication with the solenoid that processes the latching signal.

11. The system of claim 10 further comprising a vehicle operation sensor that sends a control signal which is processed by the controller which produces the latching signal.

12. The system of claim 9 where the locking pin is disengaged from the D-ring by means of a biasing force acting upon the locking pin.

13. A method of controlling the rotation of a D-ring in a seat belt system for a motor vehicle, comprising:
   providing a seat belt webbing having an upper anchorage and a lower anchorage;
   engaging an end of the webbing at act the upper or the lower anchorage that allows extraction and retraction of the webbing;
   engaging the seat belt webbing with a tongue;
   providing a buckle engageable with the tongue to secure the seat belt webbing across an occupant;
   rotatably mounting the D-ring to a fixed member of the motor vehicle;
   positioning the D-ring on the belt webbing between the upper anchorage and the tongue;
   positioning and guiding the webbing through the D-ring;
   providing a locking mechanism engagable with the D-ring for restricting the range of backward rotation of the D-ring; and
   controlling the locking mechanism to periodically engage the locking mechanism.

14. The method of claim 13 where a period of engagement of the locking mechanism initiates in response to a signal produced by a vehicle operation sensor.

15. The method of claim 13 where a period of engagement of the locking mechanism initiates in response to a signal produced when the tongue and the buckle are latched.

16. The method of claim 13 where the step of controlling the locking mechanism is governed by a controller in communication with the buckle, with a vehicle operation sensor, and with the locking mechanism.

17. The method of claim 13 where the locking mechanism is a movable locking pin engaged by an electric solenoid.

18. The method of claim 17 where the locking pin is disengaged by means of a biasing force acting upon the locking pin.

* * * * *